No. 870,079. PATENTED NOV. 5, 1907.
I. BOLTAN.
EYEGLASS MOUNTING.
APPLICATION FILED MAR. 30, 1907.
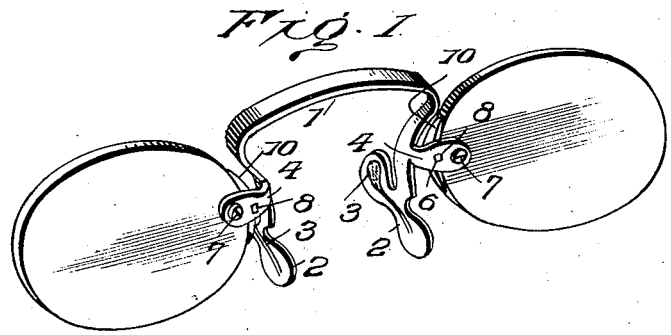
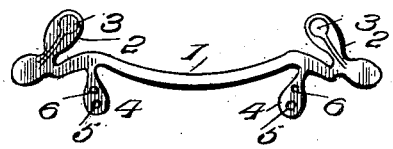
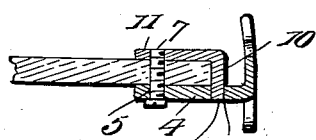
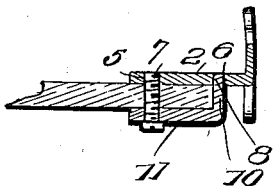
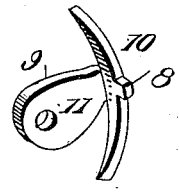
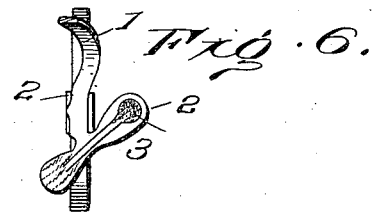
Inventor
I. Boltan
Witnesses
By
Attorneys

UNITED STATES PATENT OFFICE.

ISAAC BOLTAN, OF HOT SPRINGS, ARKANSAS.

EYEGLASS-MOUNTING.

No. 870,079.    Specification of Letters Patent.    Patented Nov. 5, 1907.

Application filed March 30, 1907. Serial No. 365,559.

*To all whom it may concern:*

Be it known that I, ISAAC BOLTAN, a citizen of the United States, residing at Hot Springs, in the county of Garland and State of Arkansas, have invented certain new and useful Improvements in Eyeglass-Mountings, of which the following is a specification.

This invention appertains to the connecting means between the lenses of eyeglasses, the purpose being to devise a cheap, light and effective mounting free from joints and adapted to admit of attachment to either side of the lenses to throw the latter a greater or less distance from the eyes to avoid interference with the eyebrows, or according as the wearer may desire to have the lenses closer to or farther removed from the eyes without changing the location of the nose grips.

For a full description of the invention reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of a pair of eyeglasses embodying the invention. Fig. 2 is a detail view of the blank from which the mounting is formed and preliminary to bending the same into the desired shape. Fig. 3 is a sectional view of a side portion of the mounting and lenses. Fig. 4 is a view similar to Fig. 3 showing the mounting attached to the opposite side of the lens from that shown in Fig. 3. Fig. 5 is a detail view of one of the detachable studs utilized in clamping the lens in position. Fig. 6 is a transverse sectional view through a pair of eyeglasses constructed in accordance with the invention.

Corresponding and like parts are referred to in the following description and indicated in all the views of the drawings by the same reference characters.

The mounting comprises bow 1, guards 2, nose grips 3 and studs 4, all formed of a single blank preferably of sheet metal from which the blank is stamped and having the form substantially as shown in Fig. 2. The studs 4 are located a short distance from the extremities of the strip forming the bow 1 and are provided with openings 5 and 6. The openings 5 receive the screws 7, whereas the openings 6 receive projections 8 of separate stud pieces. The guards 2 are formed at the extremities of the strip and oppositely incline so as to conform approximately to the profile of the nose and grip the same at a uniform distance from the outer portion. The nose pieces 3 are in the nature of spring tongues pressed out from the guards 2 and have connection therewith at one end, the opposite end being deflected so as to normally project beyond the plane of the inner side of the guard so as to more firmly grip the nose and retain the eyeglasses in position. The inner sides of the nose pieces and guards may be roughened or finished in any manner to prevent slipping and to obviate injurious and annoying pressure upon the nose. The blank is bent into the desired shape to form the bow 1 which is curved so as to fit about the nose and enable the guards and nose grips to properly engage with the nose. The nose pieces 3 are somewhat elastic and supplement the action of the bow 1, whereby a firm but easy grip is obtained. The studs 4 are bent outward and may engage either side of the lenses according as the latter are to come close to the eyes or be removed therefrom so as to clear the eyebrows and lashes. Coöperating with the mounting and forming a part thereof, are two studs 9, each consisting of opposite extensions constituting a body portion 10, a wing 11 and a projection 8. The extensions or body portion 10 engage with the edge of the lens, whereas the wing 11 laps along side the lens and clamps the latter between it and the stud 4. The screw 7 passes through the opening 5 of the stud 4 and into a corresponding opening of the wing 11. The projection 8 of the stud 9 passes through the opening 6 of the stud 4, thereby preventing turning of the complementary members of a stud when in position and secured to a lens by a screw or fastening 7. The construction is such that the stud 4 may be placed against either the outer or inner side of the lens according to the desired distance of the lens from the eye, the stud 9 being placed upon the opposite side of the lens.

It will be understood from the foregoing that the mounting comprises a minimum number of parts and is practically free from joints which are liable to corrode or catch foreign matter and weaken the mounting and render the same liable to breakage. It will be further understood that by having the parts formed of a single blank, the mounting may be cheaply manufactured and bent into desired shape according to the design of the mounting.

Having thus described the invention, what is claimed as new is:

An eyeglass mounting comprising a bow, nose pieces carried by the bow, an integral flat stud projecting from each end of the bow, said studs being each formed with a pair of openings one of which is threaded and one not threaded, detachable studs coöperating with the beforementioned integral studs and each comprising a perforated wing a laterally extending body portion engaging the edges of the lens, and a projection designed to enter the unthreaded opening in the corresponding integral stud, the said detachable studs being designed to be applied to either side of the lenses, and clamping screws passing through the perforated wings of the detachable studs and engaging the threaded openings in the integral studs to clamp the lens in position.

In testimony whereof I affix my signature in presence of two witnesses.

ISAAC BOLTAN. [L. S.]

Witnesses:
LAMERD J. RINALDO,
A. C. JENNINGS.